US00RE40366E

(19) United States
(12) Reissued Patent
Jian

(10) Patent Number: US RE40,366 E
(45) Date of Reissued Patent: Jun. 10, 2008

(54) OVEN WITH A SPRAYING DEVICE

(75) Inventor: Wei-Wen Jian, City of Industry, CA (US)

(73) Assignee: Guangdong Elecpro Electric Appliance Holding Co., Ltd., Foshan, Guangdong (CN)

(21) Appl. No.: 10/317,346

(22) Filed: Dec. 13, 2002

Related U.S. Patent Documents

Reissue of:
(64) Patent No.: 6,472,642
Issued: Oct. 29, 2002
Appl. No.: 10/081,015
Filed: Feb. 19, 2002

(30) Foreign Application Priority Data

Feb. 22, 2001 (CN) ..... 01215275

(51) Int. Cl.
*A47J 37/00* (2006.01)
*A47J 37/06* (2006.01)

(52) U.S. Cl. ..... 219/431; 219/386; 219/401
(58) Field of Classification Search ..... 219/386, 219/401, 385, 393, 429, 431, 438
See application file for complete search history.

(56) References Cited

U.S. PATENT DOCUMENTS 2,371,975 A * 3/1945 Parsons ..... 219/433
2,681,978 A * 6/1954 Franklin ..... 219/391
3,139,023 A * 6/1964 Irwin ..... 99/482

FOREIGN PATENT DOCUMENTS

KR 2001079200 * 8/2001
WO WO89/11224 A1 * 11/1989

* cited by examiner

*Primary Examiner*—Joseph Pelham

(57) ABSTRACT

An oven with a spaying device for roasting meats is disclosed, comprising: a housing 11; an outer pot 12; an inner pot 10; a cover 4 of oven; electric heating elements 8 surrounding the outer surface of the outer pot 12; heat insulating materials 13 inserted between the housing 11 and the outer pot 12; and a control panel 16. Said oven is characterized in that it is equipped with a spraying device. The structure of said spraying device includes: a mesh-like spraying plate 1 with a plurality of holes, which is mounted in the upper part of the chamber inside the inner pot 10; case 9 of condiments, which is sealed by a cap 7, and is also provided inside the internal wall of oven 10; a conduit 2 for supplying condiments, of which one end extends through the cap 7 into the lower part of the chamber of the case 9, the other end of the conduit 2 is positioned inside the plate 1; a tubing 5 for adjusting pressure, said tubing for adjusting pressure is provided with a relief valve 3, one end of the tubing 5 extends through the cap 7 and communicates with the chamber of the case 9. The food condiments can be sprayed onto the meats being roasted evenly and automatically.

3 Claims, 1 Drawing Sheet

OVEN WITH A SPRAYING DEVICE

Matter enclosed in heavy brackets [ ] appears in the original patent but forms no part of this reissue specification; matter printed in italics indicates the additions made by reissue.

BACKGROUND OF THE INVENTION

The present invention relates to a food cooking apparatus, particularly to an oven with a spraying device for roasting meats such as chicken, duck etc.

FIELD OF THE INVENTION

DESCRIPTION OF THE PERTINENT ART

In general, when roasting meat such as chicken or duck in an oven, it is required that some condiments are sprayed onto the food being roasted. However, with conventional ovens such work of spraying condiments is done manually, so it is not convenient.

SUMMARY OF THE INVENTION

In view of the above problem, the object of the present invention is to provide an oven with a spraying device which is capable to automatically spray condiments to the meats being roasted.

The above object is accomplished by the oven with a spraying device comprising: a Housing; an outer pot; an inner pot, a Cover of oven; electric heating elements surrounding the outer surface of the outer pot; heat insulating materials inserted between the Housing and outer pot; a control panel. Said oven is characterized in that it is equipped with a spaying device. The structure of said spraying device includes: a mesh-like spraying plate with a plurality of holes therein, which is mounted in the upper part of the chamber inside the inner pot; an case of condiments, which is sealed by a cap, and is also provided inside the inner pot; a conduit for supplying condiments, of which one end extends through the cap into the lower part of the chamber of the case, the other end of the conduit is positioned inside the plate a tubing for adjusting pressure, said tubing for adjusting pressure is provided with a relief valve, one end of the tubing extends through the cap and communicates with the chamber of the case.

The operation of the oven with a spraying device according to the present invention will be described as follows:

The liquid condiments are put into the sealed case before roasting meats. When roasting the meats, the liquid condiments are pushed to the spraying plate through the conduit due to the air within the case being expanded, and then is sprayed onto the meat being roasted. When the air pressure in the case is too high, the valve can be opened to discharge a part of the air inside the case to decrease the inner pressure. In this way, the flow of the liquid condiments can be automatically adjusted.

The structure of the present invention is simple. The condiments can be automatically sprayed, so that its use is very convenient.

Figure 1:
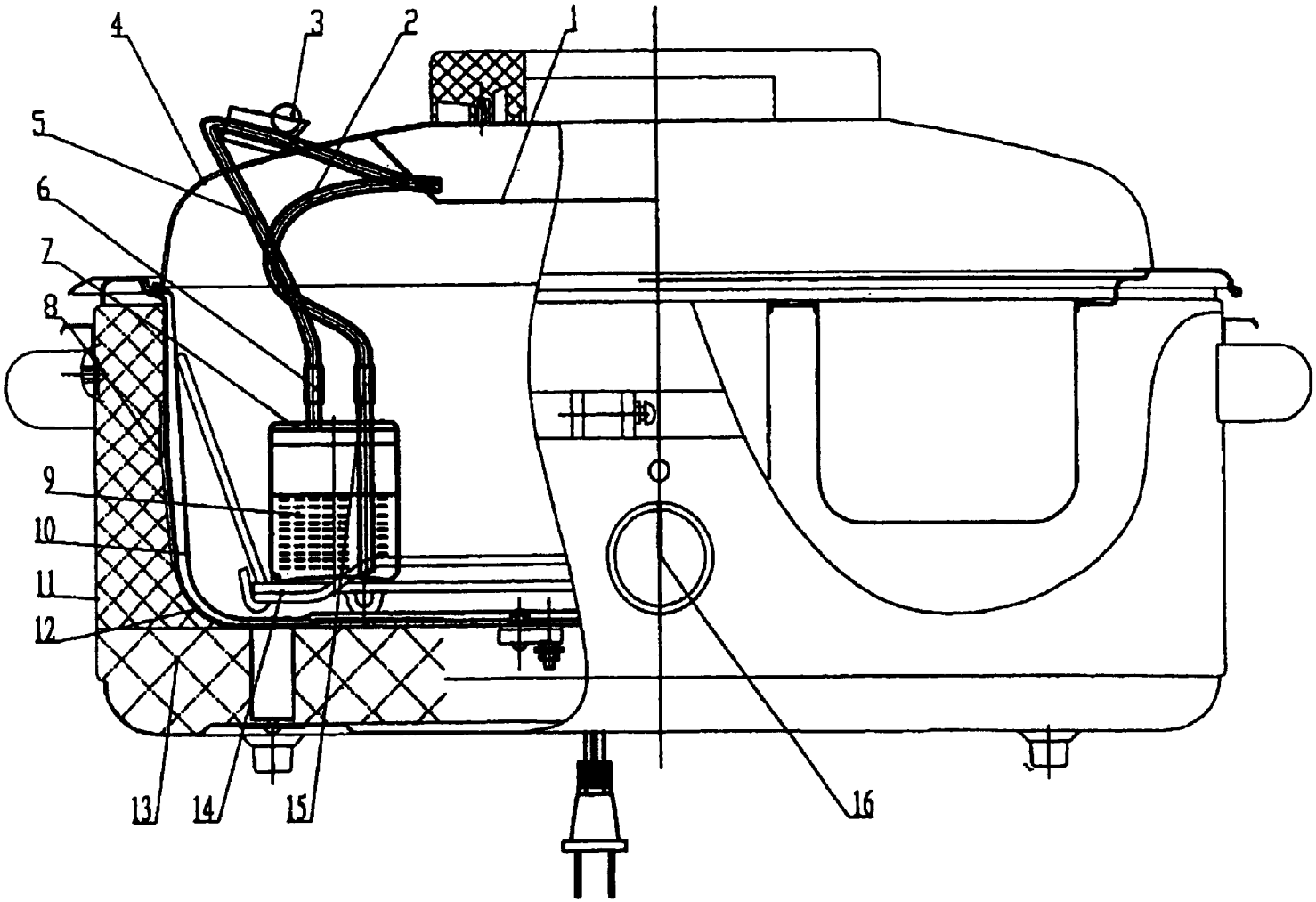
FIG. 1 is a schematic view of the structure of the embodiment of the present invention.

Wherein showing:

| | |
|---|---|
| 1. Spraying plate | 2. Conduit for supply condiments |
| 3. Relief valve | 4. Oven cover |
| 5. Tubing for adjusting pressure | 6. Pip for connecting tubing 5 with case 9 |
| 7. Cap of condiments case 9 | 8. Electric heating elements |
| 9. Condiments case | 10. Inner pot |
| 11. Housing | 12. Outer pot |
| 13. The heat insulating materials | 14. Hanger for hanging meats roasted |
| 15. Pipe for conecting conduit 2 with case 9 | 16. Control panel |

DESCRIPTION OF THE PREFERRED EMBODIMENT

An embodiment of the present invention will be described below.

As shown in FIG. 1, the spraying plate 1 with a plurality of spraying holes on it is fixed under the cover 4, the hanger 14 for hanging meat roasted is provided inside the inner pot 10, the condiments case 9 is sealed by the cap 7, the pipe 6 connecting the tubing 5 for adjusting pressure and the pipe 15 connecting the conduit 2 are both made of stainless steel and provided on the cap 7, one end of the pipe 15 extending to the bottom of the case 9 is bevel, the other end of the pipe 15 above the upper surface of the cap 7 connects to an end of the conduit 2, the other end of the conduit 2 is located within the spraying plate 1, an end of the pipe 6 penetrates the cap 7 and flushes with the inner surface of the cap 7 and the other end of the pipe 6 above the cap 7 connects to the lower end of the tubing 3 for adjusting pressure which is provided with a relief valve 3 fixed to the upper surface of the cover 4. The upper end of the tubing 5 extends to above the plate 1.

What is claimed is:

1. An oven with a spraying device, comprising: a housing (11); an outer pot (12); an inner pot (10); a cover (4) of oven; electric heating elements (8) surrounding the outer surface of the outer pot (12); heat insulating materials (13) inserted between the housing (11) and the outer pot (12); a control panel (16); said oven is characterized in that it is equipped with a spraying device, and the structure of said spraying device includes: a mesh-like spraying plate (1) with a plurality of holes therein, which is mounted in the upper part of the chamber inside the inner pot (10); a case (9) of condiments, which is sealed by a cap (7), and is also provided inside the inner pot (10); a conduit (2) for supplying condiments, of which one end extends through the cap (7) into the lower part of the chamber of the case (9), the other end of the conduit (2) is positioned inside the plate (1); a tubing (5) for adjusting pressure, said tubing for adjusting pressure is provided with a relief valve (3), one end of the tubing (5) extends through the cap (7) and communicates with the chamber of the case (9).

2. In the oven of claim 1, wherein said spraying plate (1) is mounted under the cover (4), a hanger (14) for hanging meat roasted is provided inside the inner pot (10), the condiments case (9) is sealed by the cap (7), a pipe (6) connecting the tubing (5) for adjusting pressure and a pipe (15) connecting the conduit (2) are both made of stainless steel and provided on the cap (7), one end of the pipe (15) extending to the bottom of the case (9) is bevel, the other end of the pipe (15) above the upper surface of the cap (7) connects to an end of the conduit (2), the other end of the conduit (2) is located within the spraying plate(1), an end of the pipe(6) penetrates the cap (7) and is flush with the inner surface of the cap (7) and the other end of the pipe (6) above the cap (7) connects to the lower end of the tubing (5) for adjusting pressure which is provided with a relief valve (3), and the upper end of the tubing (5) extends to above the plate (1).

3. In the oven of claim 1 or 2 wherein the place where said tubing(5) for adjusting pressure provided with the relief valve (3) is outside the cover (4) and the valve (3) is on the cover (4).

* * * * *